UNITED STATES PATENT OFFICE.

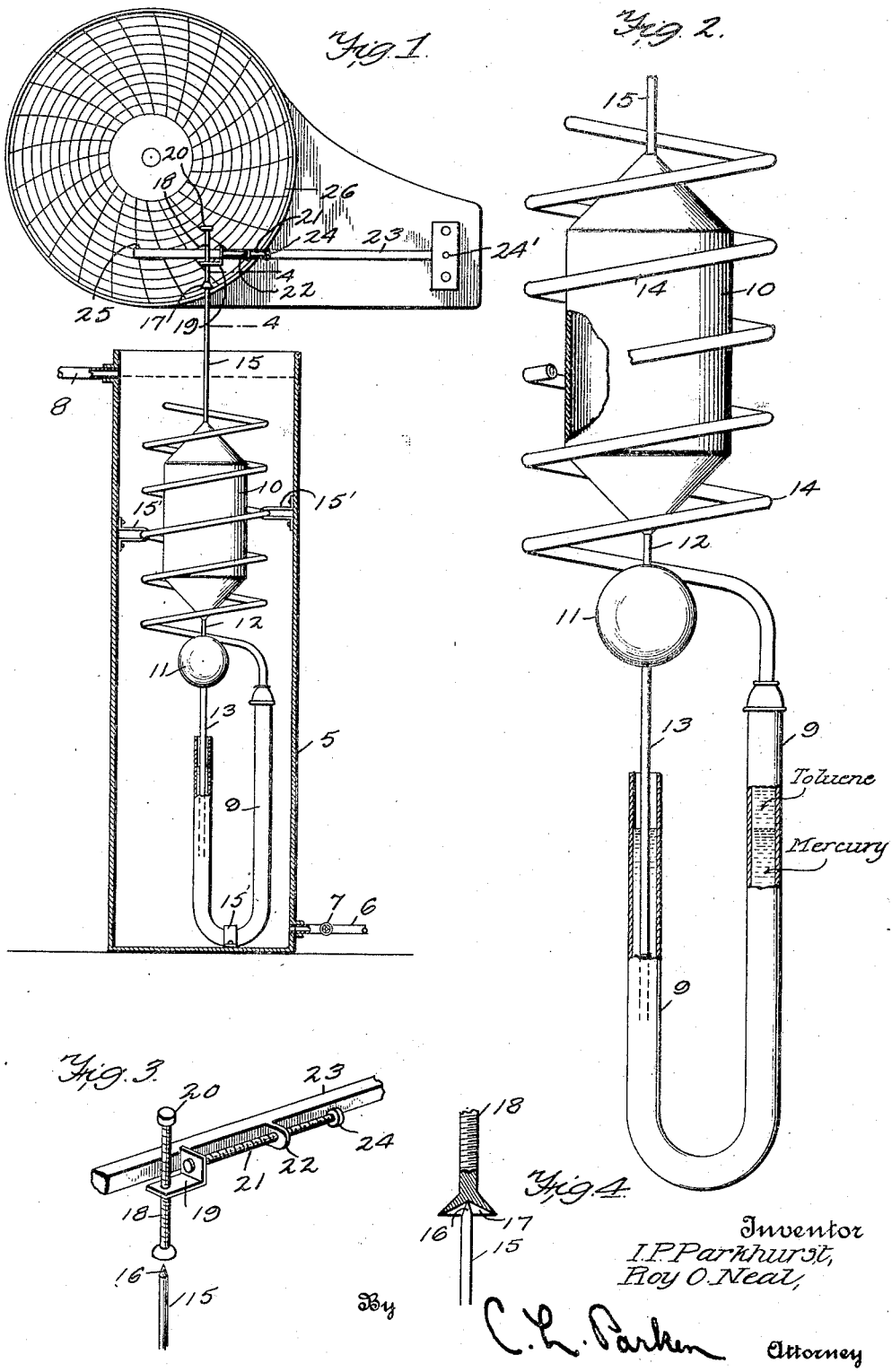

IVAN P. PARKHURST AND ROY O. NEAL, OF KINSLEY, KANSAS.

DEVICE FOR INDICATING THE DENSITY OF LIQUIDS.

1,368,524.  Specification of Letters Patent.  Patented Feb. 15, 1921.

Application filed July 26, 1919. Serial No. 313,647.

*To all whom it may concern:*

Be it known that we, IVAN P. PARKHURST and ROY O. NEAL, citizens of the United States, residing at Kinsley, in the county of Edwards and State of Kansas, have invented certain new and useful Improvements in Devices for Indicating the Density of Liquids, of which the following is a specification.

Our invention relates to a device for indicating and preferably recording continuously the density of liquids.

An important object of the invention is to provide a device of the above-mentioned character which is accurate and automatic in operation, and of simple construction.

Other objects and advantages of the invention will be apparent during the course of the following description.

In the accompanying drawings forming a part of this specification, and in which like numerals are employed to designate like parts throughout the same:

Figure 1 is a side elevation of apparatus embodying our invention, parts being shown in section;

Fig. 2 is a similar view of the operating parts, the U-tube being shown in section;

Fig. 3 is a perspective view of the pen lever; and,

Fig. 4 is a detail view, parts in section of a contact connection.

In the drawings, wherein for the purpose of illustration is shown a preferred embodiment of our invention, the numeral 5 designates a vertical receptacle, through which the liquid, the density of which is to be recorded, is continuously passed. The liquid is introduced into the lower end of the receptacle through a pipe 6, equipped with a valve 7 to control the supply. The liquid passes from the upper end of the receptacle 5 through a pipe 8.

Arranged within the lower portion of the receptacle 5, and held stationary therein by any suitable means, is a U-tube 9, having a uniform bore. This tube is adapted for the reception of a liquid having a heavy specific gravity, such as mercury.

The numeral 10 designates a submerged float-body, which is preferably in the form of a hollow shell filled with air. This float-body is submerged in the liquid within the tank 5 and is buoyed up by the same. Arranged beneath the float body 10 is a weight 11 connected therewith by an element 12, and this weight serves as a stabilizer for the float body 11. Connected with the weight 11 is a depending plunger-rod 13, formed of a material which will not be acted upon by the liquid or mercury in the U-tube or by the liquid within the receptacle 5. This plunger rod is slidable within one arm of the U-tube, the diameter of the bore of the U-tube 9 being larger than the diameter of the plunger-rod 13.

Connected with the upper end of the outer arm of the U-tube 9 is a tubular coil 14, held stationary by any suitable means, such as straps 15', attached to the tank or receptacle 5. This tubular coil has its upper end closed and the coil is filled with an expansible liquid, such as toluene. The volume of the liquid in the coil will depend upon the cubical coefficient of expansion of the toluene or other liquid within the coil and of the coefficient of expansion of the liquid within the U tube.

Connected with the upper end of the float-body 10 is a rod or needle 15, preferably pointed at its upper end, as shown at 16. This rod or needle contacts within a conical recess formed in a head 17 carried by an adjustable rod 18. This adjustable rod is screw threaded to engage within a screw threaded opening formed in a bracket 19, the rod being provided at its upper end with a milled head 20 by means of which it may be conveniently turned. The bracket 19 is swiveled upon a second adjustable rod 21, having screw threaded engagement within a bracket 22, carried by a pen-lever 23, pivoted at 24'. The rod 21 carries a milled head 24 by means of which it may be turned. The lever 23 is provided at its free end with a pen 25, adapted to record or mark upon a rotatable recording sheet 26, advanced by any well known or preferred mechanism.

The density of the liquid continuously passing through the receptacle 5 is recorded by the movement of the pen upon the chart 26, which is driven at a suitable speed. The movement of the pen is effected in a downward direction by gravity, while it is moved upwardly by the rod 15 contacting with the head 17. It is obvious that any change in the specific gravity of the liquid passing through the tank 5, without a change in its temperature, will effect a vertical movement of the float-body 10 which will actuate the recording pen. If the temperature of the liquid rises the toluene in the tube will expand thereby raising the level of the mercury in the other arm of the U-tube. This elevated level of the mercury acts upon the plunger-rod 13 tending to elevate it in a corresponding manner. This will move the weight 11 upwardly and release the float-body 10 for upward movement. The extent of the upward movement of the plunger rod 13 must be such as to exactly offset the downward movement of the float-body 10, due to the change of temperature of the water in the tank 5 from the standard temperature.

It is to be understood that the form of our invention herewith shown and described is to be taken as the preferred example of the same, and that various changes in the shape, size and arrangement of parts may be resorted to without departing from the spirit of the invention or the scope of the subjoined claims.

Having thus described our invention, we claim:

1. In apparatus for indicating the density of liquids, a receptacle for receiving the fluid, a float body embodying a plunger rod arranged within the receptacle, a tube receiving a heavy liquid and having the plunger rod operating therein in contact with the heavy liquid, and a receptacle connected with the U-tube and receiving an expansible fluid said receptacle being arranged within the first mentioned receptacle.

2. In apparatus for indicating the density of liquids, a receptacle having inlet and outlet means, a float body arranged within the receptacle, a weight connected with the lower end of the float body, a plunger rod connected with the weight a tube arranged within the lower portion of the receptacle and receiving a heavy liquid and having the plunger rod operating therein, and a second tube connected with the first mentioned tube and receiving an expansible liquid.

3. In apparatus for indicating the density of liquids, a receptacle for receiving the liquid, a float-body arranged within the receptacle, a plunger rod connected with the float-body, a U-tube receiving a heavy liquid and having the plunger rod operating therein in contact with the heavy liquid, a tube connected with the U-tube and receiving an expansible fluid, said tube being arranged within the receptacle, and indicating means actuated by the float-body.

4. In apparatus for indicating the density of liquids, a receptacle having inlet and outlet means, a float-body arranged within the receptacle, a weight connected with the lower end the float-body, a plunger rod connected with the weight, a U-tube arranged within the lower portion of the receptacle and receiving a heavy liquid and having the plunger rod operating therein, a tubular coil connected with the U-tube and receiving an expansible liquid, and recording mechanism operated by the movement of the float-body.

5. In apparatus for indicating the density of liquids, a float-body, a tube having a heavy liquid therein, a plunger rod connected with the float-body and having its lower end disposed within the tube and the liquid therein, and a lighter liquid arranged in a portion of said tube, said lighter liquid being capable of expansion when the temperature rises.

6. In apparatus for indicating the density of liquids, a receptacle, a float-body arranged therein, a pivoted arm carrying indicating means, a rod extending longitudinally of the arm and having screw threaded engagement therewith so that it may be adjusted longitudinally of the arm, a bracket carried by the rod, a vertical rod having screw threaded engagement with the bracket, and a contact element carried by the float-body to engage the vertical rod.

7. An apparatus for indicating the density of liquids, a receptacle, a float-body arranged therein, a pivoted arm carrying indicating means, a rod extending longitudinally of the arm and having screw threaded engagement therewith so that it may be adjusted longitudinally of the arm, a bracket carried by the rod, a vertical rod having screw threaded engagement with the bracket and provided in its lower end with a conical recess, and a pointed contact element carried by the float-body and having its point in engagement with the conical recess formed in said vertical rod.

In testimony whereof we affix our signatures in presence of two witnesses.

IVAN P. PARKHURST
ROY O. NEAL.

Witnesses:
H. E. CRAVER,
J. G. THORNBURY.